(12) United States Patent
Chia

(10) Patent No.: US 8,009,367 B2
(45) Date of Patent: Aug. 30, 2011

(54) ZOOM LENS SYSTEM

(75) Inventor: Shuo-chi Chia, Tantz Shiang (TW)

(73) Assignee: Asia Optical Co., Inc., Tantz Shiang, Taichung (TW)

( * ) Notice: Subject to any disclaimer, the term of this patent is extended or adjusted under 35 U.S.C. 154(b) by 0 days.

(21) Appl. No.: 12/712,032

(22) Filed: Feb. 24, 2010

(65) Prior Publication Data

US 2010/0214668 A1    Aug. 26, 2010

(30) Foreign Application Priority Data

Feb. 24, 2009  (TW) ................................ 98105880 A

(51) Int. Cl.
*G02B 15/14* (2006.01)

(52) U.S. Cl. ........................................................ 359/687

(58) Field of Classification Search .................... 359/687
See application file for complete search history.

(56) References Cited

U.S. PATENT DOCUMENTS 6,650,475 B1 * 11/2003 Hamano ........................ 359/557

* cited by examiner

*Primary Examiner* — William Choi

(74) *Attorney, Agent, or Firm* — Cheng-Ju Chiang

(57) ABSTRACT

A zoom lens system includes, in order from an object side to an image side along an optical axis thereof, a first lens group having positive refractive power, a second lens group having negative refractive power, a third lens group having positive refractive power and a fourth lens group having positive refractive power. When zooming from a wide-angle end to a telephoto end, both the first and third lens groups move to the object side, and the second lens group first moves to the image side and then moves to the object side, whereby a first variable distance between the first and second lens groups is increased and a second variable distance between the second and third lens groups is decreased. The fourth lens group is also movable along the optical axis, so as to change a third variable distance between the third and fourth lens groups. Each of the third and fourth lens groups includes at least one aspheric surface. The zoom lens system provides a high zoom ratio and a high image resolution, and is short in overall length and small in size.

18 Claims, 9 Drawing Sheets

ZOOM LENS SYSTEM

BACKGROUND OF THE INVENTION

1. Field of the Invention

The present invention relates to a zoom lens system, and particularly to a zoom lens system with a short overall length, a compact size, a high zoom ratio and a high image resolution for forming a real image on a digital or non-digital image pickup device of a camera.

2. Description of Prior Art

In recent years, with the rapid integration of optical technology into digital electronic technology, most electronic devices such as camera mobile phones, small digital cameras and small video cameras have been integrated with a zoom lens system for effecting the photographic function. Such a zoom lens system is generally required to be small in size and light in weight for portability, while being capable of providing a high zoom ratio and a high image resolution. Generally, a high zoom ratio lens system consists of a plurality of lens groups and a considerable number of constituent lenses, whereby the overall length of the lens system is rather long. To meet the additional high-resolution requirement, special low dispersion lenses and aspheric lenses are further included in the lens system.

With the development of semiconductor technology, aspheric lenses have been widely used in a photographic lens system. The adoption of an aspheric lens effectively corrects spherical aberration associated with spherical lenses. Further, an aspheric lens functions equivalent to several spherical lenses, whereby the cost can be reduced and a compact lens system can be ensured. For a zoom lens system, in order to obtain the desired zoom ratio and optical performance within the entire zoom range while ensuring a compact configuration, the lens configuration for each lens group of the zoom lens system must be carefully designed. Conventionally, a photographic zoom lens system generally employs three lens groups in a negative-positive-positive refractive power configuration, wherein two of the three lens groups are movable for realizing zooming. However, the movement ranges of the two movable lens groups are relatively large, and the imaging performance dramatically varies with the increase of zoom ratio. To overcome these disadvantages, a zoom lens system consisting of four lens groups and thus an increased number of constituent lenses has been introduced. Three of the four lens groups are generally configured to be movable for realizing zooming. However, in order to achieve a high zoom ratio of 4× to 6× and a high image resolution, a long overall length of such a zoom lens system is necessitated for allowing movement of the three lens groups. When all the four lens groups are configured to be movable, both the number of constituent lenses and the manufacturing cost of the zoom lens system are generally increased. Further, whether three or four lens groups are configured to be movable for effecting zooming, the outer diameter of each lens group of the conventional four-group zoom lens system is generally large. This results in a large retraction space and a large retraction length when the conventional four-group zoom lens system is retracted.

It is known in the zoom lens art that, to reduce the overall length of a zoom lens system, a direct and efficient solution is to reduce the movement range of each lens group during zooming. Unfortunately, this solution generally requires an increase in precision and difficulty of manufacturing of zoom lens systems and a reliable aberration correction effect is also difficult to be ensured. Therefore, how to simplify the lens configuration so as to reduce both size and weight of the whole zoom lens system while maintaining high optical performance including a high zoom ratio and a high image resolution is a difficult problem encountered by a zoom lens designer.

Hence, an improved four-group zoom lens system, which is short in retraction length and compact in size while providing a high zoom ratio and a high image resolution, is desired to overcome the above problems encountered in the prior art.

SUMMARY OF THE INVENTION

The object of the present invention is to provide a zoom lens system consisting of four lens groups in a positive-negative-positive-positive refractive power configuration to provide a high zoom ratio and a high image resolution, the zoom lens system also being short in overall length and small in size.

To achieve the above object, the present invention provides a zoom lens system including, in order from an object side to an image side along an optical axis thereof, a first lens group having positive refractive power, a second lens group having negative refractive power, a third lens group having positive refractive power and a fourth lens group having positive refractive power. When zooming from a wide-angle end to a telephoto end, both the first and third lens groups move to the object side, and the second lens group first moves to the image side and then moves to the object side, whereby a first variable distance between the first and second lens groups is increased and a second variable distance between the second and third lens groups is decreased. The fourth lens group is also movable along the optical axis, so as to change a third variable distance between the third and fourth lens groups. Each of the third and fourth lens groups includes at least one aspheric surface.

According to the concept of the present zoom lens system, the fourth lens group moves to effect the focusing operation. The fourth lens group also may serve as a compensating lens to move together with the first, second and third lens groups during the zooming operation. During operation, the fourth lens group moves toward the object side, and also may first moves toward the object side and then toward the image side.

According to the concept of the present zoom lens system, the present zoom lens system further includes an aperture stop disposed on the object side of the third lens group. The aperture stop moves with the third lens group during zooming.

According to a first embodiment of the present zoom lens system, the first lens group consists of, in order from the object side to the image side along the optical axis of the present zoom lens system, a meniscus concave lens and a meniscus convex lens cemented with each other. Both the meniscus concave lens and the meniscus convex lens are convex toward the object side.

According to a second embodiment and a third embodiment of the present zoom lens system, the first lens group consists of, in order from the object side to the image side along the optical axis of the present zoom lens system, a cemented lens having positive refractive power and a meniscus convex lens convex toward the object side. The cemented lens is constructed by a meniscus biconcave lens cemented with a meniscus convex lens. Both the meniscus concave lens and the meniscus convex lens are convex toward the object side.

According to the concept of the present zoom lens system, the second lens group consists of, in order from the object side to the image side along the optical axis of the present zoom lens system, a first concave lens, a second concave lens and a convex lens, wherein the first and second concave lenses are arranged in such a manner that a side surface of larger curvature of the first concave lens faces a side surface of larger curvature of the second concave lens. Preferably, the first concave lens is an aspheric lens, and the second concave lens also may be an aspheric lens. According to the first embodiment of the present zoom lens system, the first concave lens is a meniscus concave lens convex toward the object side, the second concave lens is a biconcave lens, and the convex lens is a biconvex lens. According to the second embodiment of the present zoom lens system, the first concave lens is a meniscus concave lens convex toward the object side, the second concave lens is a meniscus concave lens convex toward the image side, and the convex lens is a biconvex lens. According to the third embodiment of the present zoom lens system, the first concave lens is a meniscus concave lens convex toward the object side, the second concave lens is a biconcave lens, and the convex lens is a meniscus convex lens convex toward the object side.

According to the concept of the present zoom lens system, the third lens group consists of, in order from the object side to the image side along the optical axis of the present zoom lens system, a biconvex lens, a meniscus convex lens and a meniscus concave lens. The biconvex lens is an aspheric lens, and the meniscus convex lens and the meniscus concave lens are both convex toward the object side and are cemented with each other.

According to the concept of the present zoom lens system, the fourth lens group consists of a meniscus convex lens convex toward the object side.

According to the concept of the present zoom lens system, a filter and a cover glass are further provided between the fourth lens group and an image plane.

The present zoom lens system consists of four lens groups in a positive-negative-positive-positive refractive power configuration. During the zooming operation, both the first and third lens groups move toward the object side, and the second lens group first moves toward the image side and then toward the object side, whereby the first variable distance between the first and second lens groups is increased and the second variable distance between the second and third lens groups is decreased. The fourth lens group moves to effect the focusing operation, and it also may be movable together with the first, second and third lens groups during the zooming operation. Both the third and fourth lens groups have at least one aspheric surface. By the employment of three movable lens groups for realizing zooming and the incorporation of aspheric lenses, the present zoom lens system provides a high zoom ratio of 4 to 6 times and a high image resolution. During zooming, the movement range of the second lens group is relatively small. This effectively reduces the outer diameter of the second lens group and thus increases the possibility of obtaining a compact zoom lens system when retracted. The configuration of the present zoom lens system also helps to reduce the outer diameters of both the second and third lens groups, whereby the retraction space for receiving the zoom lens system is correspondingly reduced. Thus, a compact zoom lens system is obtained, which is short in refraction length, small in outer diameter and high in zoom ratio (4-6 times). Further, the present zoom lens system consists of only nine or ten constituent lenses, which results in a short overall length and a reduced manufacturing cost.

BRIEF DESCRIPTION OF THE DRAWINGS

The present invention may be best understood through the following description with reference to the accompanying drawings, in which.

DETAILED DESCRIPTION OF THE PREFERRED EMBODIMENTS

The above-mentioned and other technical contents, features and effects of the present invention will become apparent from the hereinafter set forth detailed description of preferred numerical embodiments of the present invention in combination with the drawings.

Figure 6:
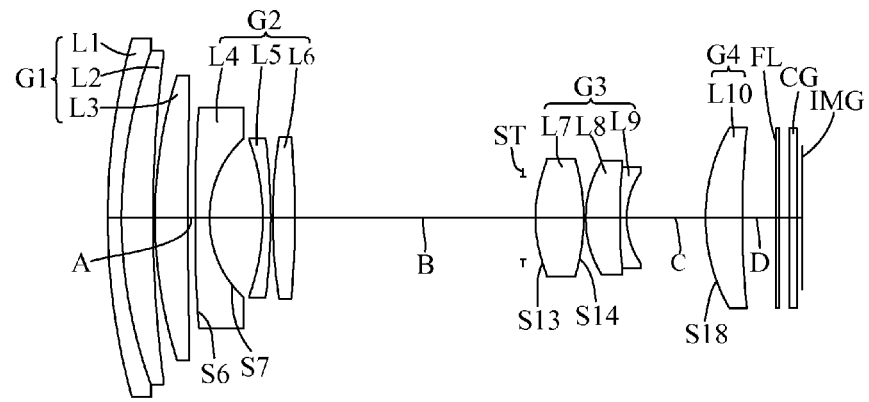
FIGS. 6-8 are schematic views respectively illustrating the constructions of a zoom lens system according to a second embodiment of the present invention at a wide-angle end, an intermediate position and a telephoto end.
Figure 7:
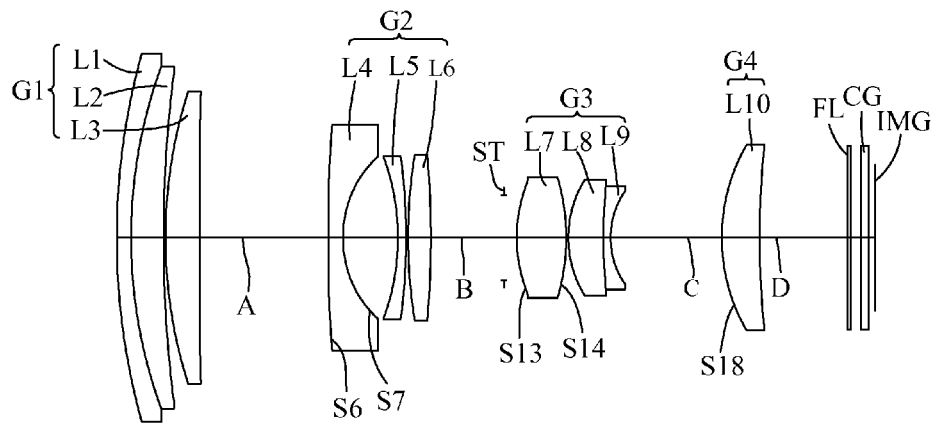
Figure 8:
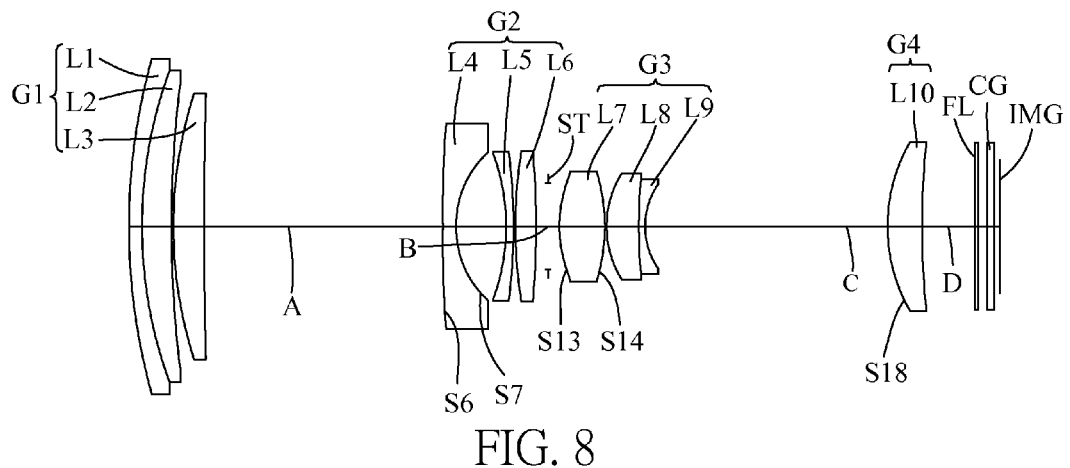
Figure 9:
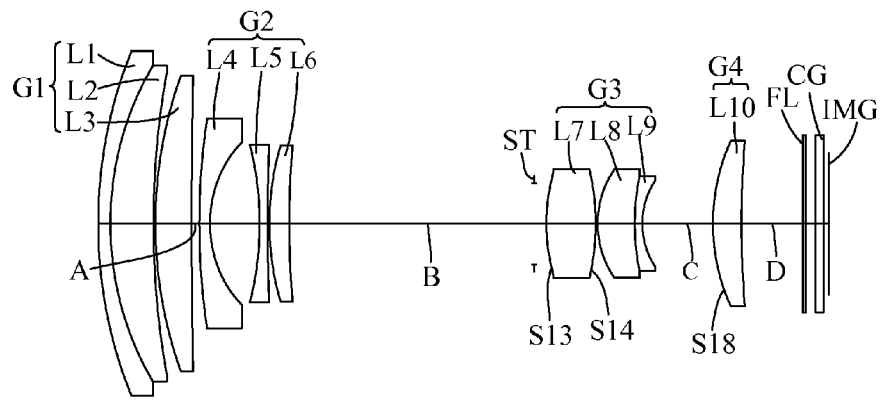
FIGS. 9-11 are schematic views respectively illustrating the constructions of a zoom lens system according to a third embodiment of the present invention at a wide-angle end, an intermediate position and a telephoto end.
Figure 10:
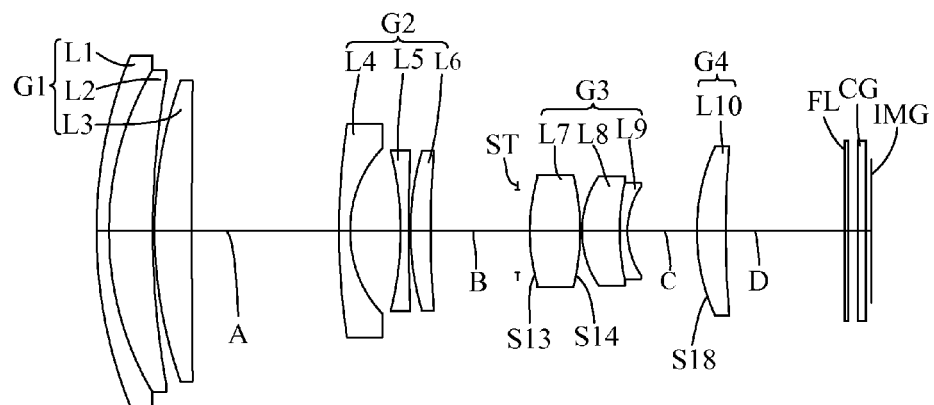
Figure 11:
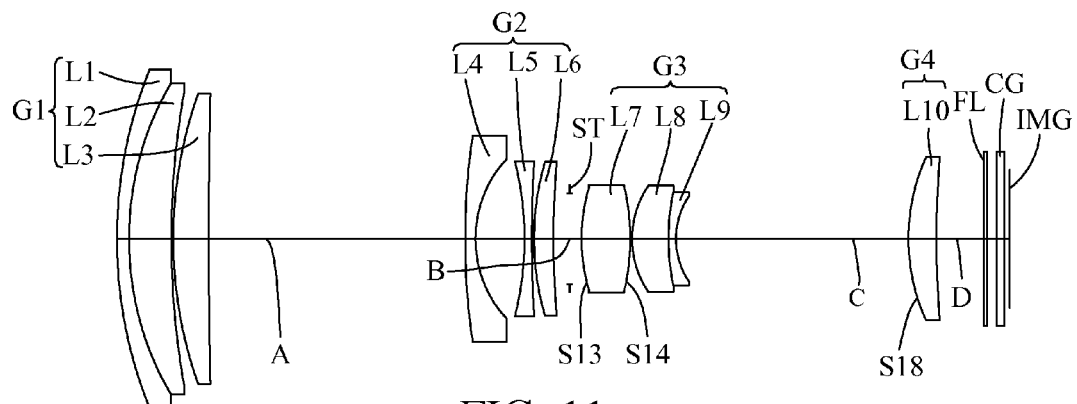

The present invention provides a zoom lens system, which is used in an image pickup device or a photographic device for forming an image of an object on an image sensor (CCD or CMOS). The construction of the zoom lens system according to a first embodiment of the present invention at a wide-angle end, an intermediate position and a telephoto end are respectively illustrated in FIGS. 1 to 3. FIGS. 6-8 are schematic views respectively illustrating the construction of the zoom lens system according to a second embodiment of the present invention at the wide-angle end, the intermediate position and the telephoto end, and FIGS. 9-11 are schematic views respectively illustrating the construction of the zoom lens system according to a third embodiment of the present invention at the wide-angle end, the intermediate position and the telephoto end. FIGS. 4A-4D and FIGS. 5A-5D respectively illustrate graphic representations of various aberrations of the first embodiment of the zoom lens system at the wide-angle end and the telephoto end.

The zoom lens system of the present invention includes, in order from an object side to an image side along an optical axis thereof, a first lens group G1 having a positive refractive power, a second lens group G2 having a negative refractive power, a third lens group G3 having a positive refractive power, and a fourth lens group G4 having a positive refractive power. An aperture stop ST is provided on the object side of the third lens group G3.

The first lens group G1, which has a positive refractive power, consists of a cemented lens having a positive refractive power (according to the first embodiment, FIGS. 1-3), or consists of a cemented lens having a positive refractive power and a meniscus convex lens L3 convex toward the object side (according to the second and third embodiments, FIGS. 6-8 and FIGS. 9-11). The cemented lens is constructed by a meniscus concave lens L1 convex toward the object side cemented with a meniscus convex lens L2 convex toward the object side. The second lens group G2 consists of, in order from the object side to the image side along the optical axis, a first concave lens, a second concave lens and a convex lens, wherein the first and second concave lenses are arranged in such a manner that a side surface of larger curvature of the first concave lens faces a side surface of larger curvature of the second concave lens. The third lens group G3 is a compensating lens group and serves to compensate for spherical and coma aberrations. The third lens group G3 consists of, in order from the object side to the image side along the optical axis, a biconvex lens and a cemented lens. The biconvex lens has at least one aspheric surface, and the cemented lens is constructed by a meniscus convex lens cemented with a meniscus concave lens. The fourth lens group G4 consists of a meniscus convex lens, which is convex toward the object side and has at least one aspheric surface. The above constituent lenses of the present zoom lens system may be all made of glass. Alternatively, some constituent lenses such as aspheric lenses may be made of plastic.

When zooming from the wide-angle end to the telephoto end, both the first and third lens groups G1, G3 of the zoom lens system move toward the object side, and the second lens group G2 first moves toward the image side and then toward the object side, so that a first variable distance A between the first and second lens groups G1, G2 is increased and a second variable distance B between the second and third lens groups G2, G3 is decreased. During the zooming operation, the aperture stop ST moves together with the third lens group G3.

The fourth lens group G4 moves to effect the focusing operation. When focusing, the fourth lens group G4 moves to change a third variable distance C between the third and fourth lens groups G3, G4. This movement of the fourth lens group G4 serves to compensate for a shift in the image plane due to a variation in magnification during zooming. The fourth lens group G4 also may serve as a compensating lens group to move together with the first, second and third lens groups G1, G2, G3 during the zooming operation, and then move independently for effecting the focusing operation.

The zoom lens system is constructed by four lens groups consisting of nine or ten lenses, among which at least two lenses are preferably configured to be aspheric lenses to effectively correct aberrations. Preferably, both the third and fourth lens groups G3 and G4 include one aspheric lens having at least one aspheric surface. The aspheric surfaces of these aspheric lenses are expressed by the following formula:

$$D = \frac{CH^2}{1 + \sqrt{1-(1+k)C^2H^2}} + E_4H^4 + E_6H^6 + E_8H^8 + E_{10}H^{10}$$

where D represents displacement in the direction of the optical axis at the position of height H from the optical axis relative to the surface vertex; C=1/r; r is the curvature radius of the aspheric lens surface on the optical axis; H represents a height of a point on the aspheric surface with respect to the optical axis; K represents a cone constant; and $E_4$, $E_6$, $E_8$ and $E_{10}$ are respectively aspheric coefficients for fourth, sixth, eighth and tenth order terms.

Three exemplary embodiments of the present zoom lens system will be described in detail hereinafter.

First Embodiment

Figure 1:
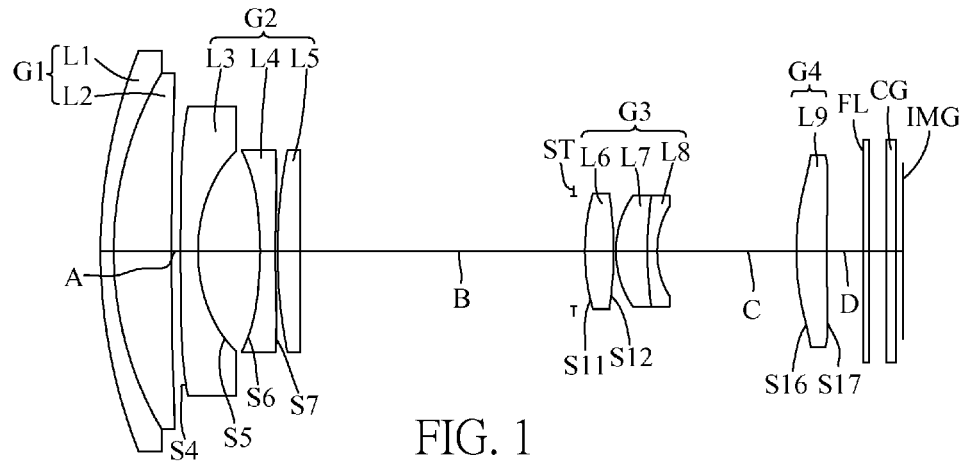
FIGS. 1-3 are schematic views respectively illustrating the constructions of a zoom lens system according to a first embodiment of the present invention at a wide-angle end, an intermediate position and a telephoto end.
Figure 2:
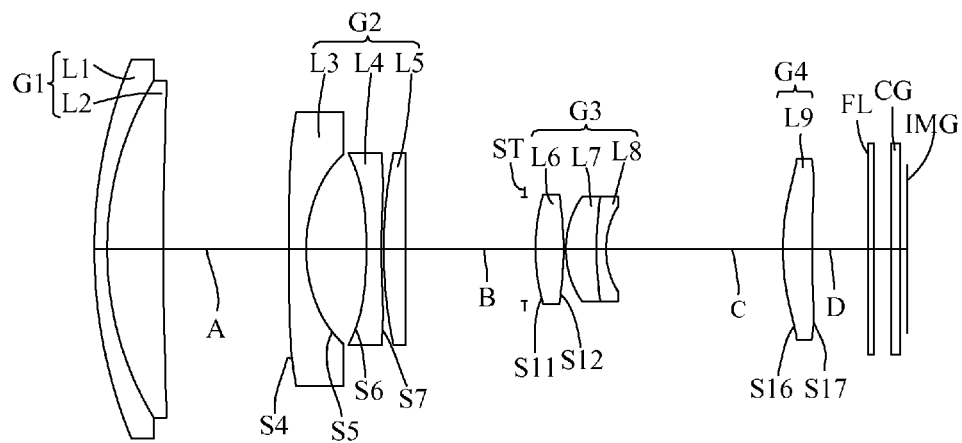
Figure 3:
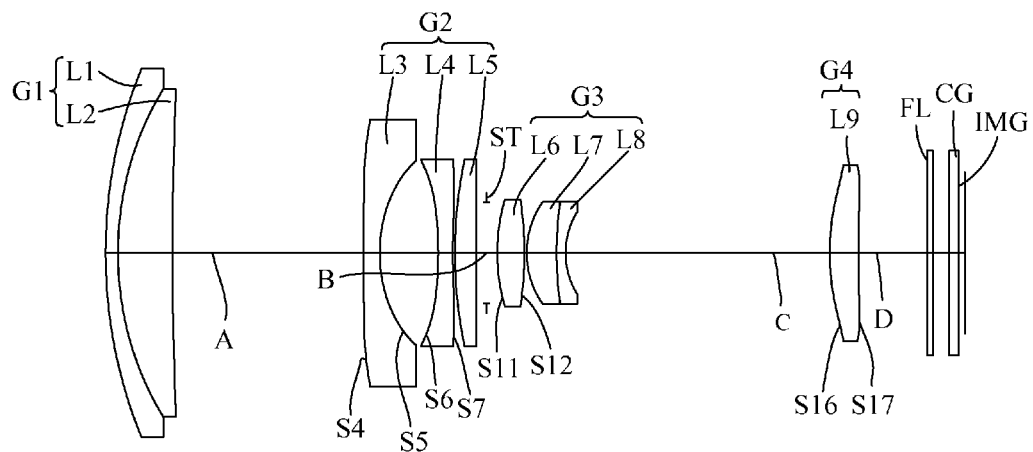

Referring to FIGS. 1-3, the schematic construction of a zoom lens system according to a first embodiment of the present invention at a wide-angle end, an intermediate position and a telephoto end are respectively illustrated. According to the first embodiment, the zoom lens system includes, in order from an object side to an image side along an optical axis thereof, a first lens group G1 having a positive refractive power, a second lens group G2 having a negative refractive power, a third lens group G3 having a positive refractive power and a fourth lens group G4 having a positive refractive power. An aperture stop ST is provided on the object side of the third lens group G3. The first to fourth lens groups G1-G4 are all movable along the optical axis to effect zooming and focusing. When zooming, the aperture stop ST moves together with the third lens group G3.

The first lens group G1 consists of a cemented lens having a positive refractive power. The cemented lens is constructed by a first lens L1 cemented with a second lens L2. The first lens L1 is a meniscus concave lens convex toward the object side, and the second lens L2 is a meniscus convex lens also convex toward the object side.

The second lens group G2 consists of, in order from the object side to the image side along the optical axis thereof, a third lens L3, a fourth lens L4 and a fifth lens L5, wherein the third lens L3 is a meniscus concave lens convex toward the object side, the fourth lens L4 is a biconcave lens and the fifth lens L5 is a biconvex lens. The third and fourth lenses L3 and L4 are arranged in such a manner that a side surface S5 of larger curvature of the third lens L3 faces a side surface S6 of larger curvature of the fourth lens L4. Preferably, both an object-side surface S4 and an image-side surface S5 of the third lens L3 are aspheric surfaces, and both an object-side surface S6 and an image-side surface S7 of the fourth lens L4 are also aspheric surfaces.

The third lens group G3 is a compensating lens group and primarily serves to compensate for spherical and coma aberrations. The third lens group G3 consists of, in order from the object side to the image side along the optical axis, a sixth lens L6 and a cemented lens constructed by a seventh lens L7 cemented with an eighth lens L8. The sixth lens L6 is a biconvex lens with both an object-side surface S11 and an image-side surface S12 thereof to be aspheric. The seventh lens L7 is a meniscus convex lens convex toward the object side, and the eighth lens L8 is a meniscus concave lens also convex toward the object side.

The fourth lens group G4 consists of a ninth lens L9 in the form of a meniscus convex lens convex toward the object side. Preferably, both an object-side surface S16 and an image-side surface S17 of the ninth lens L9 are aspheric surfaces.

Additional optical elements may be further provided between the fourth lens group G4 and an image plane IMG. As shown, such optical elements may include a filter FL in the form of a low pass filter LPF and a cover glass CG coated with optical films. It is to be understood that almost any optical element with desired function or construction known to those of ordinary skill in the art may be employed. The image plane IMG coincides with a light-receiving surface of an image sensor such as CCD.

When the zoom lens system of the first embodiment zooms from a wide-angle end (FIG. 1) to a telephoto end (FIG. 3), both the first and third lens groups G1 and G3 move to the object side, and the second lens group G2 first moves to the image side and then to the object side, whereby a first variable distance A between the first and second lens groups G1 and G2 is increased and a second variable distance B between the second and third lens groups G2 and G3 is decreased. During zooming, the aperture stop ST moves together with the third lens group G3.

The focusing operation is accomplished by the fourth lens group G4. The fourth lens group G4 also may serve as a compensating lens group to move together with the first, second and third lens groups G1, G2 and G3 during the zooming operation, and then move independently for effecting the focusing operation and thus compensating an image plane shift due to a variation in magnification during zooming.

Numerical values of the constituent elements of the zoom lens system according to the first embodiment of the present invention are shown in Data Table 1 given below. In Data Table 1 and other similar data tables provided hereinafter, "Si" represents the order of the surface from the object side (including surfaces of the lenses L1-L9, the aperture stop ST and light incidence surfaces and light exit surfaces of the filter FL and the glass element CG), "INF" represents infinity, "Ri" represents the radius of curvature (mm) of the ith surface from the object side, and "Di" represents the ith member thickness or the distance (mm) between the ith surface and the (i+1)th surface along the optical axis. In addition, the two surfaces cemented with each other are represented by the same surface number for simplicity.

DATA TABLE 1

| Si | Surface Type | Element | Ri (mm) | D (mm) |
|---|---|---|---|---|
| S1 | Spherical | L1 | 20.857037 | 0.700 |
| S2 | Spherical | L2 | 13.731835 | 3.096 |
| S3 | Spherical | | 165.775268 | A |
| S4 | Aspheric | L3 | 387.551067 | 0.923 |
| S5 | Aspheric | | 6.281316 | 3.318 |
| S6 | Aspheric | L4 | −16.040448 | 0.821 |
| S7 | Aspheric | | 41.695103 | 0.120 |
| S8 | Spherical | L5 | 19.299295 | 1.221 |
| S9 | Spherical | | −5344.285390 | B |
| S10 | Virtual | ST | INF | 0.600 |
| S11 | Aspheric | L6 | 8.025878 | 1.550 |
| S12 | Aspheric | | −13.215418 | 0.120 |
| S13 | Spherical | L7 | 3.858795 | 1.693 |
| S14 | Spherical | L8 | 15.548405 | 0.511 |
| S15 | Spherical | | 3.387626 | C |
| S16 | Aspheric | L9 | 11.253443 | 1.622 |
| S17 | Aspheric | | 310.163845 | D |
| S18 | Planar | LPF | INF | 0.30 |
| S19 | Planar | | INF | 0.95 |
| S20 | Planar | CG | INF | 0.50 |
| S21 | Planar | | INF | 0.37 |
| S22 | Planar | CCD | INF | 0.00 |

It is apparent from Data Table 1 that the lens groups G2, G3 and G4 of the zoom lens system of the first embodiment all include aspheric surfaces to effectively correct various aberrations and thus obtain desired image performance. Specifically, with reference to FIGS. 1-3, both the object-side surface S4 and the image-side surface S5 of the meniscus concave lens L3 in the second lens group G2, both the object-side surface S6 and the image-side surface S7 of the biconcave lens L4 in the second lens group G2, both the object-side surface S11 and the image-side surface S12 of the biconvex lens L6 in the third lens group G3, and both the object-side surface S16 and the image-side surface S17 of the meniscus convex lens L9 in the fourth lens group G4 are all configured to be aspheric surfaces.

Data Table 2 given below shows a cone constant K and related aspheric coefficients $E_4$, $E_6$, $E_8$ and $E_{10}$ for the above aspheric surfaces of the zoom lens system according to the first embodiment.

DATA TABLE 2

| Si | K | $E_4$ | $E_6$ | $E_8$ | $E_{10}$ |
|---|---|---|---|---|---|
| S4 | 0 | 1.870581E−05 | 9.409815E−06 | −1.681017E−07 | 9.023831E−10 |
| S5 | 0 | −1.051235E−05 | 1.554391E−05 | −1.578588E−07 | 1.608852E−08 |
| S6 | 0 | −5.426188E−05 | −6.005696E−05 | 1.740831E−07 | 5.132204E−08 |
| S7 | 0 | −1.162273E−04 | −6.155935E−05 | 2.051812E−06 | −2.289202E−09 |
| S11 | 0 | −3.151457E−04 | 8.583487E−05 | −1.354580E−05 | 1.464261E−06 |
| S12 | 0 | 2.293699E−04 | 1.099817E−04 | −1.716547E−05 | 1.801306E−06 |
| S16 | 0 | 1.254823E−03 | −1.323356E−04 | 4.161604E−06 | −7.619417E−08 |
| S17 | 0 | 1.796562E−03 | −1.920010E−04 | 6.256909E−06 | −9.905594E−08 |

When the present zoom lens system of the first embodiment zooms in or out, the first variable distance A between the first and second lens groups G1 and G2, the second variable distance B between the second group G2 and the third lens group G3 or the aperture stop ST, the third variable distance C between the third and fourth lens groups G3 and G4 and the fourth variable distance D between the fourth lens group G4 and the filter FL all vary. Data Table 3 provided below shows the values (mm) of these variable distances A, B, C and D, and also the effective focal length EFL, the F number FNO and the total track length TTL of the present zoom lens system of the first embodiment. In Data Table 3, "W" denotes the wide-angle end, "M" denotes the intermediate position and "T" denotes the telephoto end.

DATA TABLE 3

| | W | M | T |
|---|---|---|---|
| EFL | 6.397 | 13.791 | 28.723 |
| FNO | 3.115 | 3.690 | 4.701 |
| TTL | 42.996 | 44.618 | 48.674 |
| A | 0.500 | 6.908 | 10.812 |
| B | 14.657 | 6.512 | 0.575 |
| C | 7.469 | 9.721 | 14.964 |
| D | 1.955 | 3.061 | 3.908 |

It can be seen from Data Table 3 that, the zoom lens system of the first embodiment has a short total track length and a zoom ratio of 4.49 times. When zooming from the wide-angle end to the telephoto end, the first variable distance A, the third variable distance C and the fourth variable distance D are all increased, and the second variable distance B is decreased.

In addition, the effective focal lengths fG1, fG2, fG3 and fG4 of the first, second, third and fourth lens groups G1, G2, G3 and G4 of the first embodiment of the present zoom lens system are 32.284 mm, −8.477 mm, 11.132 mm and 22.189 mm, respectively.

Figure 4A:
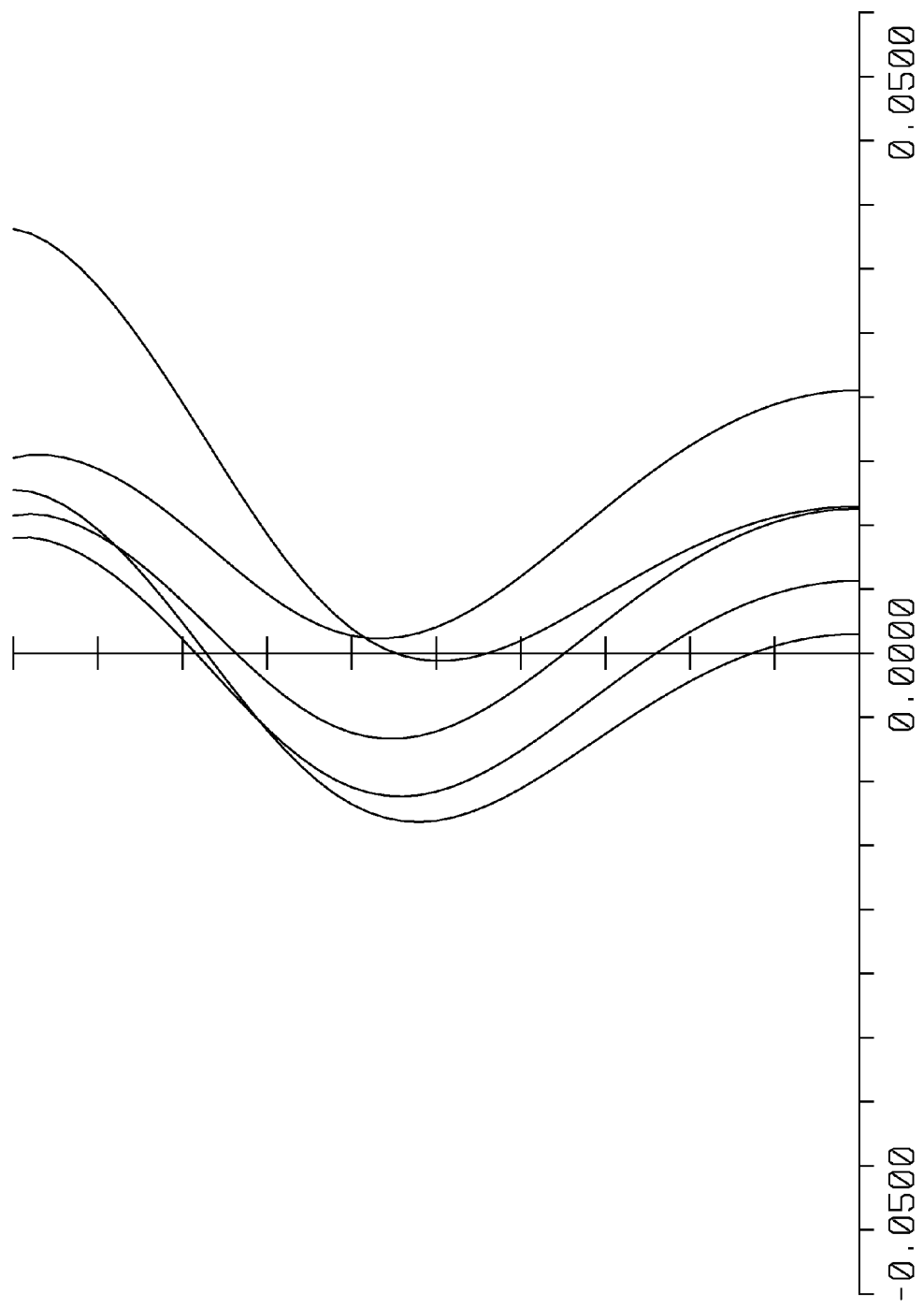
FIGS. 4A-4D are respective graphic representations of longitudinal spherical aberration, coma aberration, field curvature and distortion aberration according to the first embodiment of the present invention at the wide-angle end.
Figure 4B:
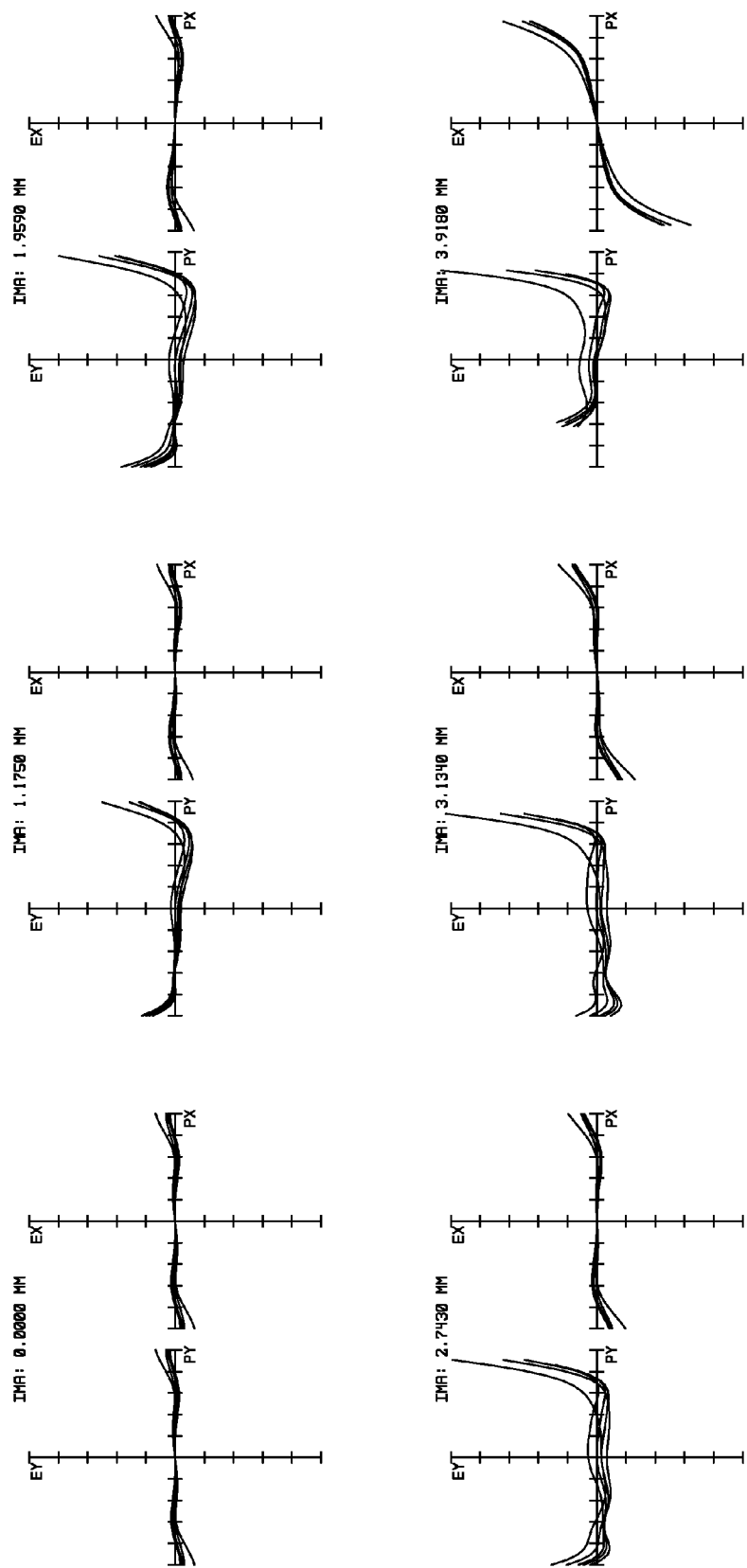
Figure 4C:
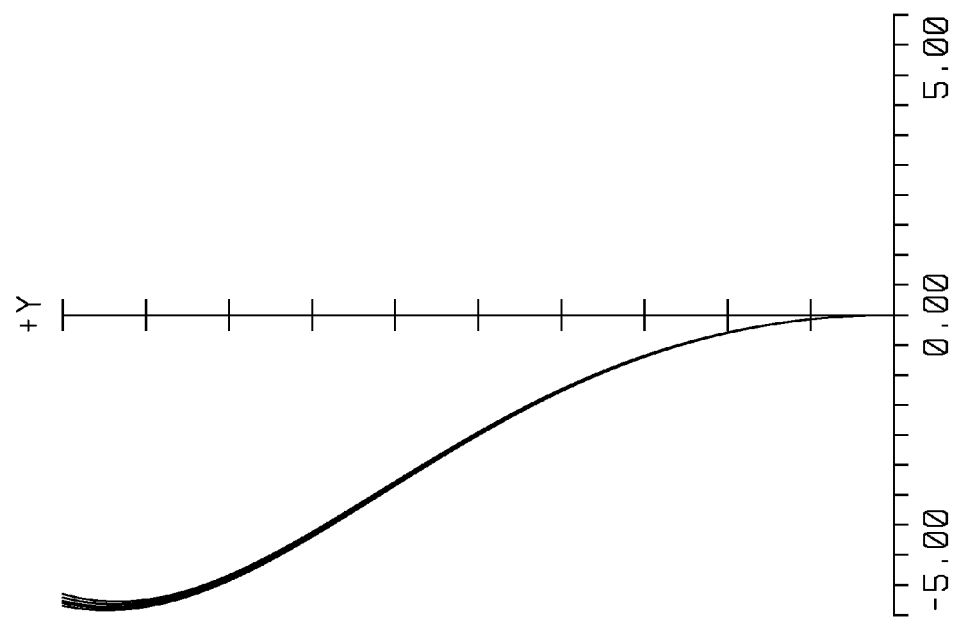
Figure 4D:
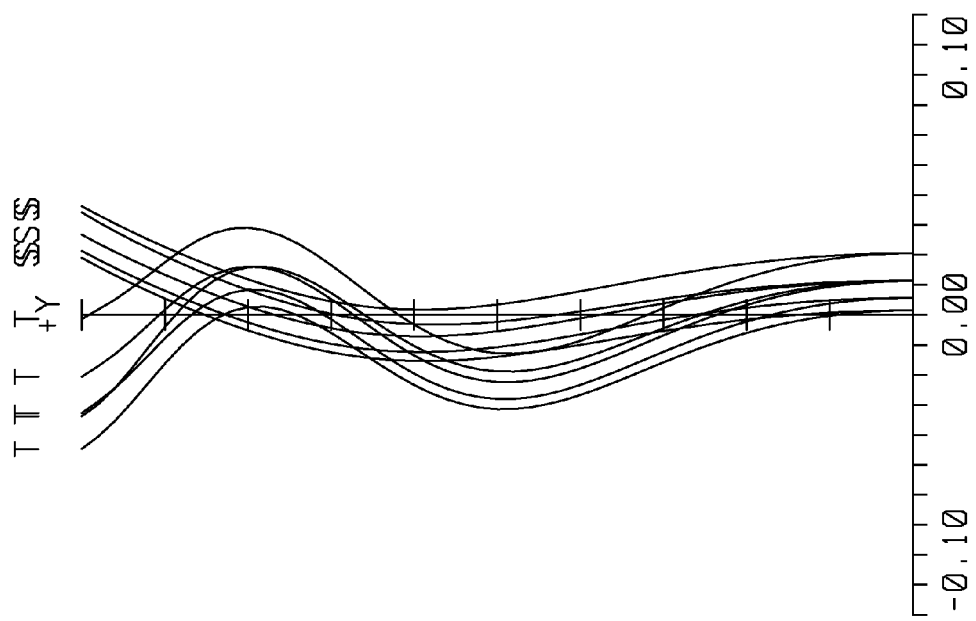
Figure 5A:
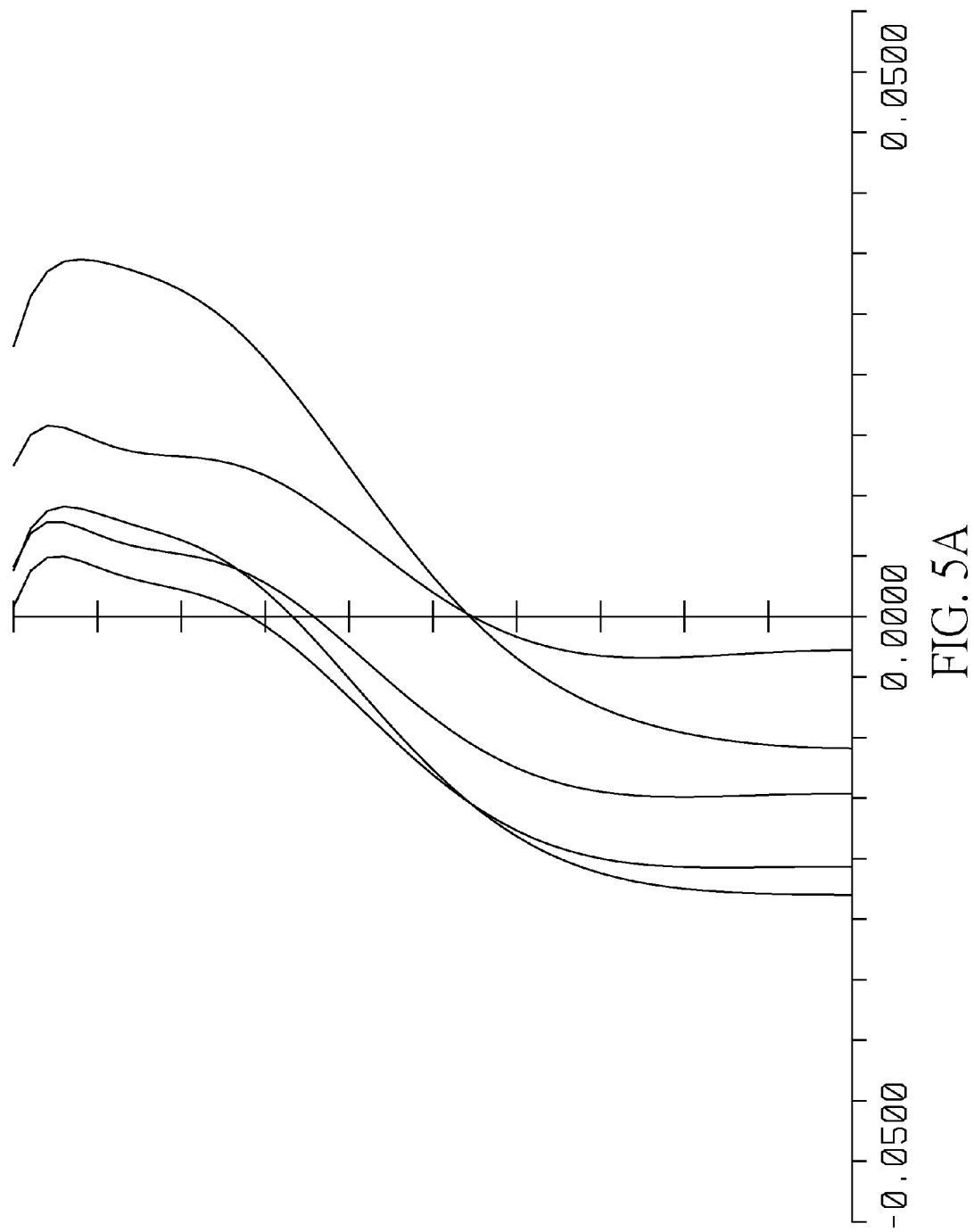
FIGS. 5A-5D are respective graphic representations of longitudinal spherical aberration, coma aberration, field curvature and distortion aberration according to the first embodiment of the present invention at the telephoto end.
Figure 5B:
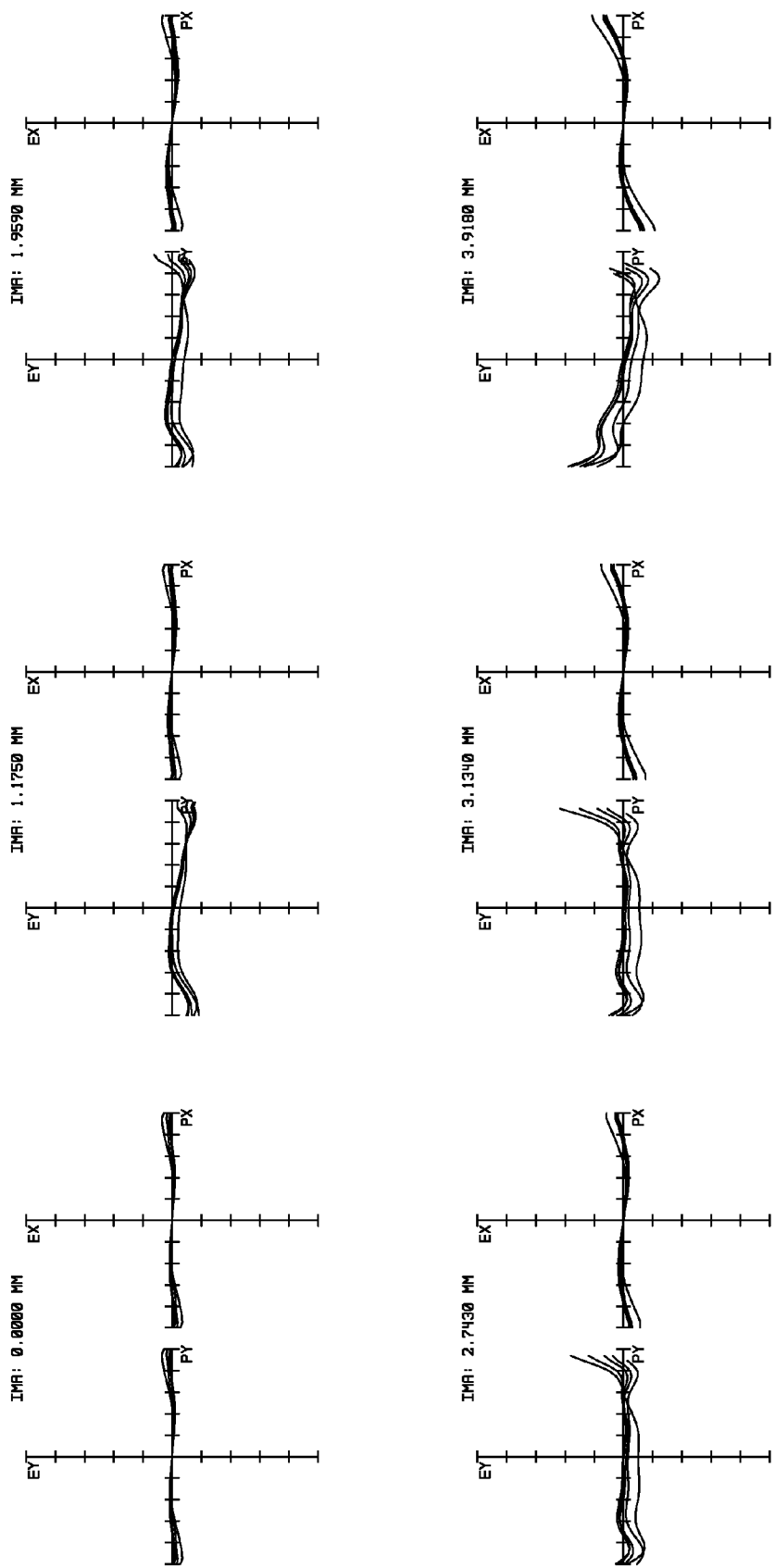
Figure 5D:
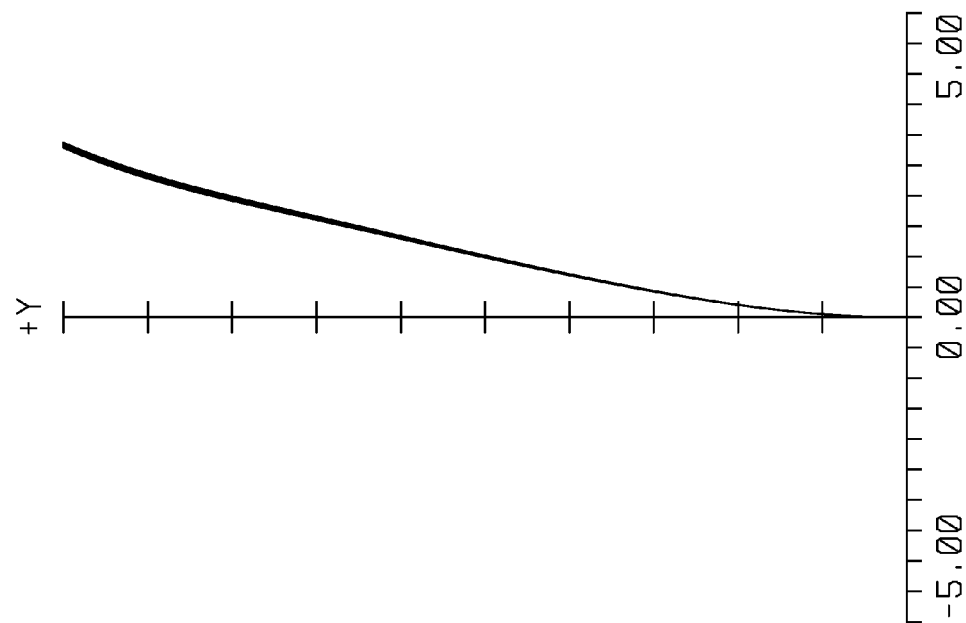
Figure 5C:
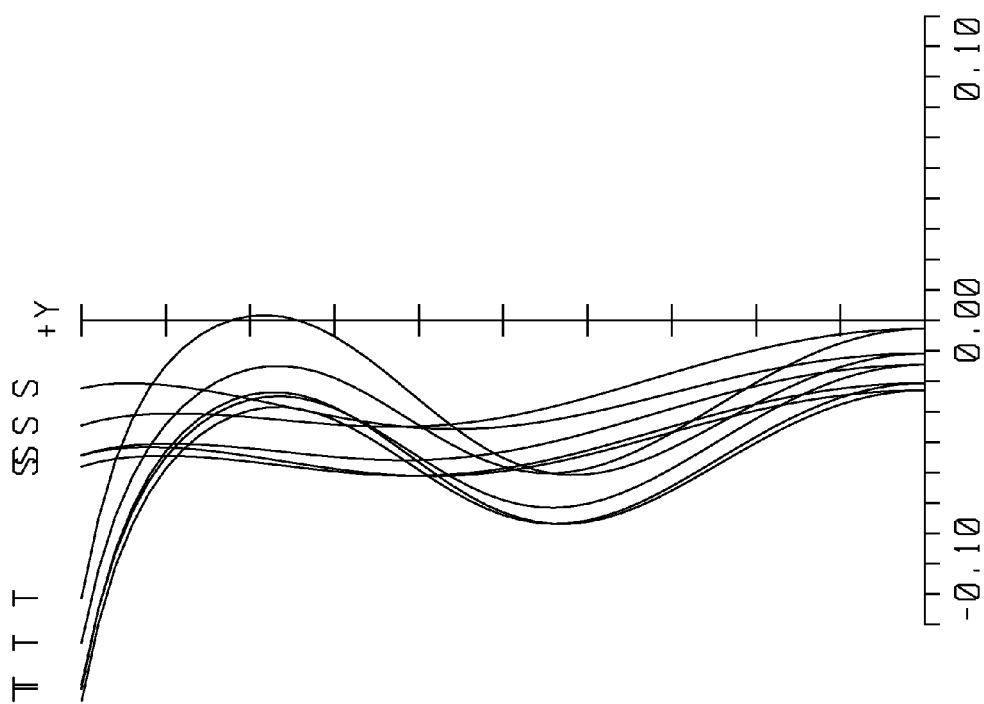

Based on these parameters shown in Data Tables 1, 2 and 3, various aberrations generated by the first embodiment of the zoom lens system at the wide-angle end and the telephoto end can be effectively corrected to ensure a high level of optical performance, which are illustrated by FIGS. 4A-4D (aberration representations at the wide-angle end) and FIGS. 5A-5D (aberration representations at the telephoto end). Among these drawings, FIGS. 4A and 5A are respective graphic representations of longitudinal spherical aberration of the first embodiment of the zoom lens system at the wide-angle end and the telephoto end, FIGS. 4B and 5B are respective graphic representations of coma aberration of the first embodiment of the zoom lens system at the wide-angle end and the telephoto end, FIGS. 4C and 5C are respective graphic representations of field curvature of the first embodiment of the zoom lens system at the wide-angle end and the telephoto end, and FIGS. 4D and 5D are respective graphic representations of distortion aberration of the first embodiment of the zoom lens system at the wide-angle end and the telephoto end.

The first embodiment of the zoom lens system satisfies the two expressions: fG2+fG3=2.655 and 2.40<EFL/(fG2+fG3)<10.82.

Second Embodiment

Referring to FIGS. 6-8, the schematic constructions of a zoom lens system according to a second embodiment of the present invention at a wide-angle end, an intermediate position and a telephoto end are respectively illustrated. According to the second embodiment, the zoom lens system includes, in order from an object side to an image side along an optical axis thereof, a first lens group G1 having a positive refractive power, a second lens group G2 having a negative refractive power, a third lens group G3 having a positive refractive power and a fourth lens group G4 having a positive refractive power. An aperture stop ST is provided on the object side of the third lens group G3. The first to fourth lens groups G1-G4 are all movable along the optical axis to effect zooming and focusing. When zooming, the aperture stop ST moves together with the third lens group G3.

The second embodiment is different from the first embodiment in that the first lens group G1 of the second embodiment consists of a positive cemented lens constructed by a first lens L1 cemented with a second lens L2 and a third lens L3. The first lens L1 is a meniscus concave lens convex toward the object side, the second lens L2 is a meniscus convex lens also convex toward the object side, and the third lens L3 is also a meniscus convex lens convex toward the object side.

The second lens group G2 consists of, in order from the object side to the image side along the optical axis, a fourth lens L4, a fifth lens L5 and a sixth lens L6, wherein the fourth lens L4 is a meniscus concave lens convex toward the object side, the fifth lens L5 is a meniscus concave lens convex toward the image side and the sixth lens L6 is a biconvex lens. The fourth and fifth lenses L4 and L5 are arranged in such a manner that a side surface S7 of larger curvature of the fourth lens L4 faces a side surface S8 of larger curvature of the fifth lens L5. Preferably, both an object-side surface S6 and an image-side surface S7 of the fourth lens L4 are aspheric surfaces.

The third lens group G3 is a compensating lens group and primarily serves to compensate for spherical and coma aberrations. The third lens group G3 consists of, in order from the object side to the image side along the optical axis, a seventh lens L7 and a cemented lens constructed by an eighth lens L8 cemented with a ninth lens L9. The seventh lens L7 is a biconvex lens with both an object-side surface S13 and an image-side surface S14 thereof to be aspheric. The eighth lens L8 is a meniscus convex lens convex toward the object side, and the ninth lens L9 is a meniscus concave lens also convex toward the object side.

The fourth lens group G4 consists of a tenth lens L10 in the form of a meniscus convex lens convex toward the object side. Preferably, the image-side surface S18 of the tenth lens L10 is an aspheric surface.

Additional optical elements may be further provided between the fourth lens group G4 and an image plane IMG. As shown, such optical elements may include a filter FL in the form of a low pass filter LPF and a cover glass CG coated with optical films. It is to be understood that almost any optical element with desired function or construction known to those of ordinary skill in the art may be employed. The image plane IMG coincides with a light-receiving surface of an image sensor such as CCD.

When the zoom lens system of the second embodiment of the present invention zooms from a wide-angle end (FIG. 6) to a telephoto end (FIG. 8), similar to the first embodiment discussed previously, both the first and third lens groups G1 and G3 move to the object side, and the second lens group G2 first moves to the image side and then to the object side, whereby a first variable distance A between the first and second lens groups G1 and G2 is increased and a second variable distance B between the second and third lens groups G2 and G3 is decreased. During zooming, the aperture stop ST moves together with the third lens group G3.

The focusing operation is accomplished by the fourth lens group G4. The fourth lens group G4 also may serve as a compensating lens group to move together with the first, second and third lens groups G1, G2 and G3 during the zooming operation, and then move independently for effecting the focusing operation and thus compensating an image plane shift due to a variation in magnification during zooming.

Numerical values of the constituent elements of the zoom lens system according to the second embodiment of the present invention are shown in Data Table 4 given below.

DATA TABLE 4

| Si | Surface Type | Element | Ri (mm) | D (mm) |
| --- | --- | --- | --- | --- |
| S1 | Spherical | L1 | 32.528170 | 0.900 |
| S2 | Spherical | L2 | 23.688113 | 2.030 |
| S3 | Spherical | | 60.984476 | 0.13 |
| S4 | Spherical | L3 | 22.790000 | 2.119 |
| S5 | Spherical | | 317.887696 | A |
| S6 | Aspheric | L4 | −371.349042 | 0.900 |
| S7 | Aspheric | | 5.649674 | 3.440 |
| S8 | Spherical | L5 | −11.126078 | 0.510 |
| S9 | Spherical | | −29.817120 | 0.13 |
| S10 | Spherical | L6 | 24.349739 | 1.430 |
| S11 | Spherical | | −43.710434 | B |
| S12 | Virtual | ST | INF | 0.800 |
| S13 | Aspheric | L7 | 6.520678 | 3.120 |
| S14 | Aspheric | | −9.619640 | 0.130 |
| S15 | Spherical | L8 | 5.331840 | 2.200 |
| S16 | Spherical | L9 | 24.724642 | 0.450 |
| S17 | Spherical | | 3.970480 | C |
| S18 | Aspheric | L10 | 8.861041 | 2.380 |
| S19 | Spherical | | 44.130149 | D |
| S20 | Planar | LPF | INF | 0.22 |
| S21 | Planar | | INF | 0.63 |
| S22 | Planar | CG | INF | 0.50 |
| S23 | Planar | | INF | 0.37 |
| S24 | Planar | CCD | INF | 0.00 |

It is apparent from Data Table 4 that the lens groups G2, G3 and G4 of the zoom lens system of the second embodiment all include aspheric surfaces to effectively correct various aberrations and thus obtain desired image performance. Specifically, with reference to FIGS. 6-8, both the object-side surface S6 and the image-side surface S7 of the meniscus concave lens L4 in the second lens group G2, both the object-side surface S13 and the image-side surface S14 of the biconvex lens L7 in the third lens group G3, and the object-side surface S18 of the meniscus convex lens L10 in the fourth lens group G4 are all configured to be aspheric surfaces.

Data Table 5 given below shows a cone constant K and related aspheric coefficients $E_4$, $E_6$, $E_8$ and $E_{10}$ for the above aspheric surfaces of the zoom lens system according to the second embodiment.

DATA TABLE 5

| Si | K | $E_4$ | $E_6$ | $E_8$ | $E_{10}$ |
|---|---|---|---|---|---|
| S6 | −19.504216 | 4.363249E−04 | −9.058187E−06 | 6.613418E−08 | 0 |
| S7 | −0.224462 | 3.766321E−04 | 2.091831E−05 | −7.277146E−07 | 0 |
| S13 | 0 | −7.219361E−04 | −1.497550E−05 | −1.625772E−07 | 0 |
| S14 | 0 | 2.822874E−04 | −1.178253E−05 | −1.055948E−07 | 0 |
| S18 | 0 | −5.782180E−05 | 2.374702E−06 | −3.804886E−08 | 0 |

As the first embodiment, when the zoom lens system of the second embodiment zooms in or out, the first variable distance A between the first and second lens groups G1 and G2, the second variable distance B between the second group G2 and the third lens group G3 or the aperture stop ST, the third variable distance C between the third and fourth lens groups G3 and G4 and the fourth variable distance D between the fourth lens group G4 and the filter FL all vary. Data Table 6 provided below shows the values (mm) of these variable distances A, B, C and D, and also the effective focal length EFL, the F number FNO and the total track length TTL of the zoom lens system of the second embodiment.

DATA TABLE 6

|  | W | M | T |
|---|---|---|---|
| EFL | 5.247 | 13.529 | 34.599 |
| FNO | 3.252 | 4.235 | 5.193 |
| TTL | 44.889 | 47.555 | 59.924 |
| A | 0.500 | 8.120 | 16.430 |
| B | 14.740 | 4.578 | 0.800 |
| C | 5.092 | 6.976 | 16.679 |
| D | 2.168 | 5.492 | 3.626 |

It can be seen from Data Table 6 that the zoom lens system of the second embodiment of the present invention has a short total track length and a zoom ratio of 6.59 times. When zooming from the wide-angle end to the telephoto end, both the first variable distance A and the third variable distance C are increased, the second variable distance B is decreased and the fourth variable distance D varies.

In addition, the effective focal lengths fG1, fG2, fG3 and fG4 of the first, second, third and fourth lens groups G1, G2, G3 and G4 of the second embodiment of the zoom lens system are 38.557 mm, −7.724 mm, 10.666 mm and 22.410 mm, respectively.

Based on these parameters shown in Data Tables 4, 5 and 6, various aberrations generated by the second embodiment of the zoom lens system at the wide-angle end and the telephoto end can be effectively corrected to ensure a high level of optical performance.

The second embodiment of the zoom lens system satisfies the two expressions: fG2+fG3=2.942 and 1.78<EFL/(fG2+fG3)<11.76.

Third Embodiment

Referring to FIGS. 9-11, the schematic constructions of a zoom lens system according to a third embodiment of the present invention at a wide-angle end, an intermediate position and a telephoto end are respectively illustrated.

The system optical construction and the movement manner of constituent lenses of the third embodiment are substantially identical to the second embodiment. The configurations of the first, third and fourth lens groups G1, G3 and G4 of the third embodiment are identical to the second embodiment, wherein the first lens group G1 of the third embodiment also consists of a positive cemented lens and a meniscus convex lens L3.

The configuration of the second lens group G2 of the third embodiment is slightly different from that of the second embodiment. Specifically, the second lens group G2 of the third embodiment consists of, in order from the object side to the image side along the optical axis, a fourth lens L4, a fifth lens L5 and a sixth lens L6, wherein the fourth lens L4 is a meniscus concave lens convex toward the object side, the fifth lens L5 is a biconcave lens and the sixth lens L6 is a meniscus convex lens convex toward the object side. The fourth and fifth lenses L4 and L5 are also arranged in such a manner that a side surface of larger curvature of the fourth lens L4 faces a side surface of larger curvature of the fifth lens L5.

Numerical values of the constituent elements of the zoom lens system according to the third embodiment are shown in Data Table 7 given below.

DATA TABLE 7

| Si | Surface Type | Element | Ri (mm) | D (mm) |
|---|---|---|---|---|
| S1 | Spherical | L1 | 22.811068 | 0.800 |
| S2 | Spherical | L2 | 15.686004 | 2.807 |
| S3 | Spherical |  | 42.129002 | 0.13 |
| S4 | Spherical | L3 | 21.797278 | 2.360 |
| S5 | Spherical |  | 414.053453 | A |
| S6 | Spherical | L4 | 34.582035 | 0.700 |
| S7 | Spherical |  | 6.094068 | 3.243 |
| S8 | Spherical | L5 | −15.692144 | 0.500 |
| S9 | Spherical |  | 78.038687 | 0.13 |
| S10 | Spherical | L6 | 13.634349 | 1.294 |
| S11 | Spherical |  | 44.357594 | B |
| S12 | Virtual | ST | INF | 0.800 |
| S13 | Aspheric | L7 | 8.754630 | 3.225 |
| S14 | Aspheric |  | −11.325957 | 0.127 |
| S15 | Spherical | L8 | 4.823159 | 2.414 |
| S16 | Spherical | L9 | 11.460087 | 0.500 |
| S17 | Spherical |  | 3.924296 | C |
| S18 | Aspheric | L10 | 10.009395 | 1.858 |
| S19 | Spherical |  | 49.852773 | D |
| S20 | Planar | LPF | INF | 0.22 |
| S21 | Planar |  | INF | 0.63 |
| S22 | Planar | CG | INF | 0.50 |
| S23 | Planar |  | INF | 0.37 |
| S24 | Planar | CCD | INF | 0.00 |

It is apparent from Data Table 7 that the lens groups G3 and G4 of the zoom lens system of the third embodiment include aspheric surfaces to effectively correct various aberrations and thus obtain desired image performance. Specifically, with reference to FIGS. 9-11, both the object-side surface S13 and the image-side surface S14 of the biconvex lens L7 in the third lens group G3, and the object-side surface S18 of the meniscus convex lens L10 in the fourth lens group G4 are all configured to be aspheric surfaces.

Data Table 8 given below shows a cone constant K and related aspheric coefficients $E_4$, $E_6$, $E_8$ and $E_{10}$ for the above aspheric surfaces of the zoom lens system according to the third embodiment.

DATA TABLE 8

| Si | K | $E_4$ | $E_6$ | $E_8$ | $E_{10}$ |
|---|---|---|---|---|---|
| S13 | 0 | −4.296656E−04 | −4.045978E−06 | 1.670532E−07 | 0 |
| S14 | 0 | 9.421357E−05 | −1.707594E−06 | 1.291659E−07 | 0 |
| S18 | 0 | −4.760987E−05 | 4.365473E−06 | −5.879734E−08 | 0 |

Data Table 9 provided below shows the values (mm) of the variable distances A, B, C and D, and also the effective focal length EFL, the F number FNO and the total track length TTL of the zoom lens system of the third embodiment.

DATA TABLE 9

|  | W | M | T |
|---|---|---|---|
| EFL | 6.569 | 16.866 | 43.248 |
| FNO | 3.467 | 4.180 | 4.971 |
| TTL | 47.678 | 49.683 | 59.24 |
| A | 0.500 | 9.460 | 17.000 |
| B | 15.972 | 5.556 | 1.064 |
| C | 4.611 | 4.445 | 15.422 |
| D | 3.987 | 7.613 | 3.146 |

It can be seen from Data Table 9 that, the zoom lens system of the third embodiment has a short total track length and a zoom ratio of 6.58 times. When zooming from the wide-angle end to the telephoto end, the first variable distance A is increased, the second variable distance B is decreased, and both the third variable distance C and the fourth variable distance D vary.

In addition, the effective focal lengths fG1, fG2, fG3 and fG4 of the first, second, third and fourth lens groups G1, G2, G3 and G4 of the third embodiment of the zoom lens system are 38.229 mm, −8.698 mm, 11.665 mm and 25.483 mm, respectively.

Based on these parameters shown in Data Tables 7, 8 and 9, various aberrations generated by the third embodiment of the zoom lens system at the wide-angle end and the telephoto end can be effectively corrected to ensure a high level of optical performance.

The third embodiment of the zoom lens system satisfies the two expressions: fG2+fG3=2.967 and 2.21<EFL/(fG2+fG3)<14.58.

As described above, the zoom lens system of the present invention consists of four lens groups in a positive-negative-positive-positive refractive power configuration. During the zooming operation, both the first and third lens groups G1 and G3 move toward the object side, and the second lens group G2 first moves toward the image side and then toward the object side, whereby the first variable distance A between the first and second lens groups G1 and G2 is increased and the second variable distance B between the second and third lens groups G2 and G3 is decreased. The fourth lens group G4 moves to effect the focusing operation, and it also may be movable together with the first, second and third lens groups G1, G2 and G3 during the zooming operation. Both the third and fourth lens groups G3 and G4 have at least one aspheric surface. By the employment of three movable lens groups for realizing zooming and the incorporation of aspheric lenses, the present zoom lens system provides a high zoom ratio of 4 to 6 times and a high image resolution. During zooming, the movement range of the second lens group G2 is relatively small. This effectively reduces the outer diameter of the second lens group G2 and thus increases the possibility of obtaining a compact zoom lens system when retracted. The configuration of the zoom lens system of the present invention also helps to reduce the outer diameters of both the second and third lens groups G2 and G3, whereby the retraction space for receiving the zoom lens system is correspondingly reduced. Thus, a compact zoom lens system is obtained, which is short in retraction length, small in outer diameter and high in zoom ratio (4-6 times). Further, the present zoom lens system consists of only nine or ten constituent lenses, which results in a short overall length and a reduced manufacturing cost.

Further, as is apparent from the above descriptions of the first, second and third embodiments, the zoom lens system of the present invention satisfies the following condition:

$$1.78 < EFL/(fG2+fG3) < 14.58$$

where fG2 represents an effective focal length of the second lens group G2, fG3 represents an effective focal length of the third lens group G3 and EFL represents an effective focal length of the zoom lens system.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens system, in order from an object side to an image side along an optical axis thereof, comprising:
    a first lens group having positive refractive power;
    a second lens group having negative refractive power;
    a third lens group having positive refractive power; and
    a fourth lens group having positive refractive power;
    wherein, during zooming from a wide-angle end to a telephoto end, both the first and third lens groups move to the object side, and the second lens group first moves to the image side and then moves to the object side, whereby a first variable distance between the first and second lens groups is increased and a second variable distance between the second and third lens groups is decreased; wherein the fourth lens group is also movable along the optical axis to change a third variable distance between the third and fourth lens groups; and wherein each of the third and fourth lens groups includes at least one aspheric surface;
    the zoom lens system satisfying the following condition:

$$1.78 < EFL/(fG2+fG3) < 14.58$$

where fG2 represents an effective focal length of the second lens group, fG3 represents an effective focal length of the third lens group and EFL represents an effective focal length of the zoom lens system inclusive of the range from the wide-angle end to telephoto end.

2. The zoom lens system as claimed in claim 1, wherein the fourth lens group moves to effect focusing and is also movable together with the first, second and third lens groups during zooming.

3. The zoom lens system as claimed in claim 2, wherein the fourth lens group moves toward the object side.

4. The zoom lens system as claimed in claim 2, wherein the fourth lens group first moves toward the object side and then toward the image side.

5. The zoom lens system as claimed in claim 1, further comprising an aperture stop disposed on the object side of the third lens group, the aperture stop moving with the third lens group during zooming.

6. The zoom lens system as claimed in claim 1, wherein the first lens group comprises, in order from the object side to the image side along the optical axis, a first meniscus concave lens and a second meniscus convex lens, both the first meniscus concave lens and the second meniscus convex lens being convex toward the object side.

7. The zoom lens system as claimed in claim 6, wherein the first meniscus concave lens and the second meniscus convex lens are cemented with each other.

8. The zoom lens system as claimed in claim 6, wherein the first lens group further comprises a third meniscus convex lens convex toward the object side, the third meniscus convex lens being disposed adjacent to the image side of the second meniscus convex lens.

9. The zoom lens system as claimed in claim 1, wherein the second lens group comprises, in order from the object side to the image side along the optical axis, a first concave lens, a second concave lens and a convex lens, the first and second concave lenses being arranged in such a manner that a side surface of larger curvature of the first concave lens faces a side surface of larger curvature of the second concave lens.

10. The zoom lens system as claimed in claim 9, wherein the first concave lens is an aspheric lens.

11. The zoom lens system as claimed in claim 9, wherein both the first and second concave lenses are aspheric lenses.

12. The zoom lens system as claimed in claim 9, wherein the first concave lens is a meniscus concave lens convex toward the object side, the second concave lens is a biconcave lens, and the convex lens is a biconvex lens.

13. The zoom lens system as claimed in claim 9, wherein the first concave lens is a meniscus concave lens convex toward the object side, the second concave lens is a meniscus concave lens convex toward the image side, and the convex lens is a biconvex lens.

14. The zoom lens system as claimed in claim 9, wherein the first concave lens is a meniscus concave lens convex toward the object side, the second concave lens is a biconcave lens, and the convex lens is a meniscus convex lens convex toward the object side.

15. The zoom lens system as claimed in claim 1, wherein the third lens group comprises, in order from the object side to the image side along the optical axis, a biconvex lens, a meniscus convex lens and a meniscus concave lens, both the meniscus convex lens and the meniscus concave lens being convex toward the object side.

16. The zoom lens system as claimed in claim 15, wherein the meniscus convex lens and the meniscus concave lens are cemented with each other.

17. The zoom lens system as claimed in claim 15, wherein the biconvex lens is an aspheric lens.

18. The zoom lens system as claimed in claim 1, wherein the fourth lens group consists of a meniscus convex lens convex toward the object side.

* * * * *